United States Patent [19]

Irwin

[11] Patent Number: 4,528,846
[45] Date of Patent: Jul. 16, 1985

[54] MEASURING DEVICES FOR WATERCRAFT

[76] Inventor: Howard D. Irwin, 1031 18th St., Vero Beach, Fla. 32960

[21] Appl. No.: 529,404

[22] Filed: Sep. 6, 1983

[51] Int. Cl.³ .................... G01C 21/10; G01F 23/16
[52] U.S. Cl. ........................................ 73/182; 73/300
[58] Field of Search ................................. 73/182, 300

[56] References Cited

U.S. PATENT DOCUMENTS

| 1,048,212 | 12/1912 | Roper | 73/182 |
| 3,046,784 | 7/1962 | Vicik et al. | 73/300 |
| 3,245,259 | 4/1966 | Werbowetzki | 73/300 |

FOREIGN PATENT DOCUMENTS

| 0009169 | 9/1955 | Fed. Rep. of Germany | 73/182 |
| 0015886 | of 1893 | United Kingdom | 73/300 |
| 389287 | 3/1933 | United Kingdom | 73/182 |

Primary Examiner—Donald O. Woodiel
Attorney, Agent, or Firm—Carroll F. Palmer

[57] ABSTRACT

Measuring devices for small, high performance sailboats, sailboards and other watercraft comprise a transducer to convert pressure exerted by the water through which the watercraft passes into a gas pressure within a chamber in the transducer, a gage to be carried above the water on the watercraft, the gage comprising first and second gas compartments connected by a passageway plus a liquid or solid free piston moveable in the passageway responsive to variations in gas pressure occurring in the second compartment and a flexible tube connecting the transducer chamber with the second gas compartment to transmit gas pressure variations from the chamber to the second compartment. In one embodiment, the measuring device is a speedometer. In a second embodiment, the measuring device is a depthmeter.

9 Claims, 7 Drawing Figures

U.S. Patent
Jul. 16, 1985
4,528,846
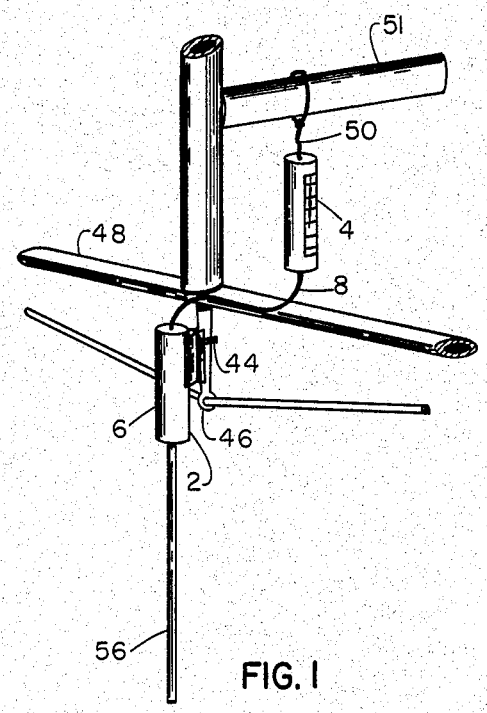
FIG. 1
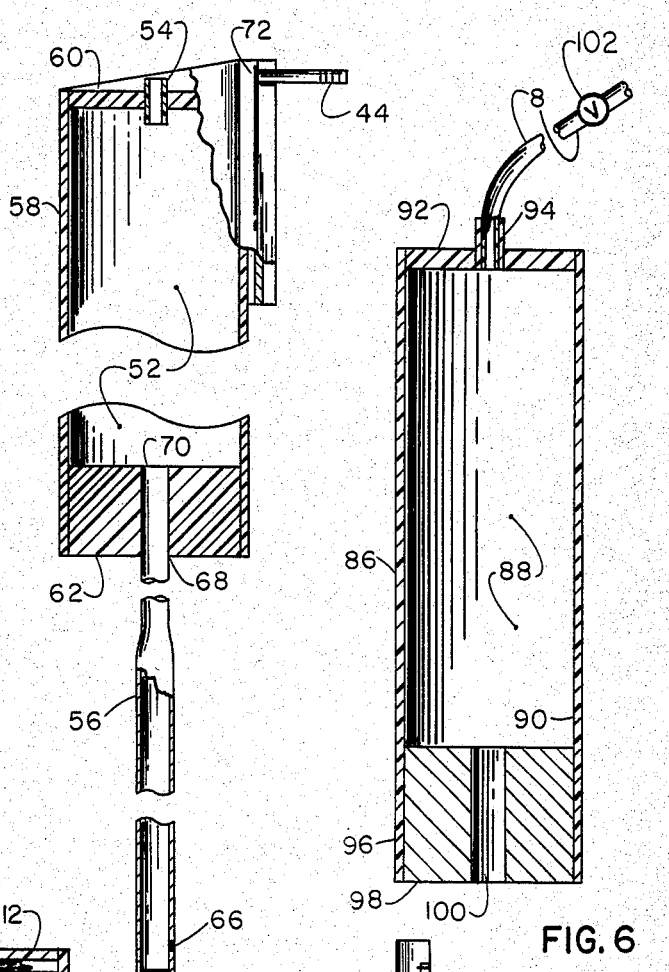
FIG. 5
FIG. 6
FIG. 7
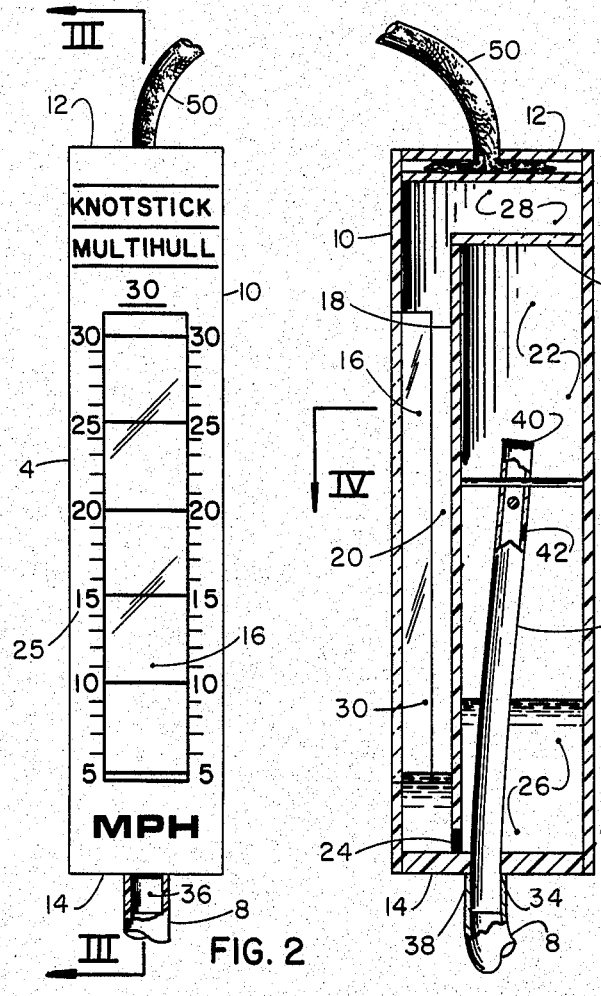
FIG. 2
FIG. 3
FIG. 4

MEASURING DEVICES FOR WATERCRAFT

BACKGROUND OF THE INVENTION

1. The Field of the Invention

This invention relates broadly to measuring devices to measure conditions existing between a watercraft and the water surrounding the watercraft.

More particularly, it concerns new forms of (a) speedometers for small, high performance sailboats, sailboards, etc. and (b) depthmeters for boats that require no electricity to operate.

2. Description of the Prior Art

Inexpensive, reasonably reliable speedometers for boats are currently available, see U.S. pat. Nos. 2,733,601 and 4,122,711. Probably the majority of such speedometers utilize stagnation pressure for measurement of speed, i.e., they are Pitot tube devices, e.g., see U.S. Pat. Nos. 1,885,933 and 3,164,016.

Pitot tubes are peculiarly suited to measurement of speed through the water at speeds above five miles per hour. The pressure signal is normally read by inexpensive, diaphragm gages calibrated to read in miles per hour rather than pressure, see U.S. Pat. No. 3,349,615. The Pitot tube pickup is normally mounted to the transom of the boat with the pressure sensing hole slightly below the transom, facing in the forward direction, see U.S. Pat. No. 3,082,623.

There is a need for an inexpensive speedometer for high performance sailboats such as small racing catamarans and sailboards. A speedometer of this type must be unusually rugged because of the difficult environment, which includes frequent capsizings. Also the speedometer should be easy to install and remove so the it need not be left permanently on the craft. Because of the cramped and difficult conditions aboard sailboats of the stated type, the speedometer must be quite visible and easy to read. Devices of the present invention utilize stagnation pressure to provide new forms of watercraft speedometers that satisfy these special requirement of small, high performance sailcraft.

For the measurement of water depth from a boat, the most basic device for this purpose has historically been the lead line, i.e., a light line with a weight tied to one end to be thrown in the water and allowed to sink to the bottom of the water. As the line is retrieved, the length of line that was immersed in the water is determined, usually via tags or other markers spaced apart along the line.

Lead lines are too primitive for the desires of most boaters, so many forms of more sophisticated depthmeters have been developed most of which are based on the use of reflected sound waves for depth measurement. Such devices require electricity for operation, are relatively expensive and cannot withstand severe environments such as are encountered in small dinghies, open motorboats and sailboats or the like. Hence, there is a need for boating depthmeters that can report depth by a direct reading gage, but which are inexpensive, do not require electricity for operation and can survive harsh environments.

OBJECTS

A principal object of this invention is the provision of new devices for use on watercraft to measure conditions existing between the watercraft and the water surrounding it, e.g., measurement of speed through the water or water depth.

Further objects include the provision of speedometers for small, high performance watercraft which:

1. Continuously display speed in an easy to read form.
2. Install and remove from a boat easily.
3. Provide a high degree of reliability and durability.
4. Can be produced and marketed at low cost.
5. Require no electrical power.
6. Do not require calibration.
7. Are corrosion and impact resistant.

Some other objects include the provision of depthmeters for watercraft which continuously display water depth directly in feet in an easy to read form and possess the additional features 2-7 listed above.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

These objects are accomplished in accordance with the present invention by the provision of devices for measuring a condition existing between a watercraft and the water surrounding the watercraft which comprise a. a transducer for immersion in the water, the transducer including a chamber, a fluid outlet for the chamber, and means to convert pressure applied to the transducer by the water to a gas pressure within the chamber of a magnitude that is a function of the water applied pressure, b. a gage to be carried by the watercraft above the water, the gage including a first gas compartment, a second gas compartment, a passageway connecting the first gas compartment to the second gas compartment, a piston moveable through the passageway responsive to changes in gas pressure occurring in the second gas compartment and means to indicate the degree of the piston movement, and c. a flexible tube connecting the fluid outlet to the second gas compartment to transmit gas pressure variations from the chamber to the second compartment.

In a preferred embodiment, the device is a speedometer wherein the transducer comprises a Pitot tube, the gage comprises a tubular section of rigid material having a closed top end and a closed bottom end, a longitudinal transparent portion is in the tubular section, a longitudinal rigid strip is within the tubular section dividing it into the first and second compartments, the means to indicate are indicia spaced apart along the transparent portion. the passageway is an opening through the rigid strip adjacent the bottom end of the tubular section, the piston is a liquid within the tubular section in quantity to fill only a portion of the volume enclosed by the tubular section, the first compartment is totally closed except for its connection with the passageway, the second compartment has an inlet therein for connection to the flexible tube and there is a tube having a lumen smaller than the lumen of the second compartment joined at its bottom end to the inlet that extends substantially centrally part way up the interior of the second compartment and its top end has a restricted opening into the second compartment.

In another embodiment, the device is is a depthmeter wherein the transducer comprises a tubular section having a top end through which the fluid outlet passes and a bottom end which is weighted and has an opening therein to join the interior of the tubular section to ambient. Aside from this difference in transducer structure, the depthmeter elements are like those of the speedometer.

BRIEF DESCRIPTION OF THE DRAWINGS

A more complete understanding of the new devices of the invention and their use may be had by reference to the accompanying drawings wherein like parts are identically numbered and in which:

FIG. 1 is a fragmentary, perspective view of a speedometer of the invention mounted on the "dolphin striker" of a racing catamaran sailboat.

FIG. 2 is plan view of the gage of the speedometer of FIG. 1.

FIG. 3 is a lateral, sectional view taken on the line III—III of FIG. 2.

FIG. 4 is a sectional view taken on the line IV—IV of FIG. 3.

FIG. 5 is a fragmentary, lateral, sectional view of a transducer used with speedometers of the invention.

FIG. 6 is a lateral, sectional view of a transducer used with depthmeters of the invention.

FIG. 7 is a fragmentary, lateral view of a modified mounting arrangement for the devices of the invention.

DETAILED DESCRIPTION OF THE PREFERRED EMBODIMENTS

Referring in detail to the drawings, the measuring device 2 of the invention basically comprises a gage 4, transducer 6, and transmitter tube 8.

The gage 4 comprises a tubular section 10 of rigid material having a closed top end 12, a closed bottom end 14 and a longitudinal transparent portion 16 in the tubular section 10. A longitudinal rigid strip 18 is within the tubular section 10 dividing it into first and second compartments 20 and 22 respectively. There is a passageway in the form of an opening 24 through the rigid strip 18 adjacent the bottom end 14 of the tubular section 10. A liquid 26 is contained within the tubular section in quantity to fill only a portion of the volume enclosed by the tubular section 10. The liquid 26 serves as a liquid piston that moves through the opening 24 in response to changes in gas pressure occurring in the second compartment 22. Indicia 25 are spaced apart along the transparent portion 16 to serve as means to indicate the degree of movement of the liquid piston.

THe first compartment 20 is totally closed except for its connection with the opening 24. Its top portion 28 that serves as a gas reservoir is of larger cross-section than the indicator portion 30 which extends longitudinally behind the transparent portion 16.

The second compartment 22 has a cap 32 closing it off at the top and a bottom inlet 34 for connection to the transmitter tube 8. A tube 36 having a lumen smaller than the lumen of the second compartment 22 is joined at its bottom end 38 to the inlet 34 and it extends substantially centrally part way up the interior of the second compartment 22. Its top end 40 is closed and there is a restricted side opening 42 in it for fluid flow into the second compartment 22.

The transducer 6 is held by clamp 44 on the dolphin striker 46 of the sailing catamaran 48 for immersion in the water, not shown, in which the catamaran 48 floats. The gage 4 has a cord or rope 50 fixed to its top end 12 by which it may be held for use, e.g., on the boom 51 of the catamaran 48.

The transducer 6 includes a chamber 52, a fluid outlet 54 for the chamber and a Pitot tube 56.

The chamber 52 is defined by a rigid tube 58 with top and bottom ends closed respectively by plugs 60 and 62. The fluid outlet 54 extends through the top end plug 60.

The Pitot tube 56 has a lower end 64 in which its pickup hole 66 is located. The hole 68 in the bottom end plug 62 tightly receives the upper end 70 of the Pitot tube 56.

A mount lug 72 is fixed to the upper portion of the rigid tube 58. This is slotted to receive the ring clamp 44. Advantageously, the longitudinal face of the lug 72 may have a female contour to receive the dolphin striker 46. In use, the transducer 6 is held by the clamp 44 on the dolphin striker 46 so that the pick up hole 66 points forward and is submerged about six inches in the water.

As the boat 48 moves through the water at velocity v it generates a pressure in the Pitot tube equal to $v^2/2g$, where v is in feet per second and g is the acceleration due to gravity in feet per second per second. The water moves up into the Pitot tube compressing the trapped air in the system. The water level will rise until the air pressure equals the pressure caused by the velocity minus the pressure due to the height of the water column in the transducer.

The pressure in the transducer 6 is transmitted to the gage 4 via the transmitter tube 8 which is of small diameter, e.g. 1-2 mm. O.D. and 0.5-1 mm. I.D., made of flexible plastic material, e.g., plasticized PVC. The pressure transmitted by the tube 8 to the second compartment 22 causes the liquid piston 26 to move down in the second compartment 22 and up in the first compartment 20 (indicator tube) until the pressures in the compartments 20 and 22 are equal, less the head pressure of liquid 26 due to difference in liquid level in the two compartments.

The rate at which the fluid 26 rises per unit change in velocity varies inversely with the cross section of the indicator portion 30 of the first compartment 20 and directly with the total volume of that compartment. Therefore, the rate of movement of the fluid piston as a function of velocity may be increased by making the gas reservoir 28 larger or by making the cross-sectional area of the indicator portion 30 smaller. More importantly, by varying the area of the indicator portion 30 as a function of vertical position a nonlinear signal may be linearized or sensitivity magnified for a speed range of particular interest. An interesting aspect of the new devices is that they do not really measure pressure directly, but rather indicate changes in volume of quantity of air or other gas in the first compartment 20. Thus, the fluid 26 acts in much the same way as a piston. In fact, for certain applications of the new devices it is possible to substitute a free piston indicator (not shown) for the fluid piston. For such modification, the indicator portion 30 would be a simple cylinder with a trapped gas volume on one side of the free piston and the imput signal on the other side.

The present invention utilizes the phenomena that although the pressure in the transducer 6 will rise to 10 to 15 psig. at higher velocities, the actual pressure differential between the two compartments 20 and 22 in the gage 4 is so small as to be trivial. Because of this, an inexpensive, flat piece of plastic may be used as the separator strip 18 and it is this same, flat separator that makes the gage highly readable.

The rate of response of the gage to a change of speed may be adjusted by means of a small capillary (not shown) in the flow outlet 54 through which the gas must flow to get from the chamber 52 to the transmitter tube 8.

The fundamental principle of operation of the new speedometers is the use of a pressure measuring device which interprets and presents stagnation pressure as a reading in miles per hour. It is worth noting that at 30 mph. The stagnation pressure is equivalent to a column of water 30 feet high or a pressure of 12.9 psig.

The theory behind the new speedometers is that if the pressure produced by movement through the water is caused to act upon a trapped volume of air it will compress the air according to the formula $P_1V_1 = P_2V_2$, where $P_1$ is the original pressure, $V_1$ is the original volume, $P_2$ is the compressed pressure and $V_2$ is the compressed volume. The fraction of the original volume lost due to the compression is given by the formula:

$$\frac{dV}{V} = \left[ 1 - \frac{P}{(P + v^2/2g)} \right]$$

Where:
V is the original volume in inches cubed
dV is the loss of volume in inches cubed
v is the velocity through the water in ft./sec.
P is the original pressure in feet of head (atmospheric)
g is the acceleration due to gravity (32.2 ft/s/s)

This formula gives the fractional loss of volume in the confined space (first compartment 20) from the application of the stagnation pressure due to velocity, v.

In the measuring devices of the invention, the air reservoir volume in the chamber 52 above the Pitot tube is such that the cross-sectional area of the chamber is large compared to the total volume of gas (air) trapped in compartment 20 against which the pressure operates. This means that the volume decreases and, hence, the pressure increases rapidly as the water level in chamber 20 rises. This permits the highest expected pressure to be obtained without risk of the water level rising into the transmitter tube 8 which transmits the pressure signal to the gage 4.

The indicator gage 4 is somewhat analogous to a U tube with one leg closed and the other leg connected to the transmitter tube 8. The bottom of the U tube is filled with a semi-opaque fluid, e.g., light mineral oil containing a dye. When the pressure in the transmitter tube rises, the air in the trapped leg of the U tube will be compressed and the indicating liquid will be forced to rise in this leg and fall in the leg connected to the transmitter tube. Except for minor corrections due to pressure head of water in the Pitot tube and that of the indicating liquid, the rise of liquid in the closed leg of the U tube is almost linear with speed increase from 5 mph. upward, despite the fact that pressure varies as the square of the speed.

The speedometer 2 is easily assembled from its parts by inserting one end of the tube 8 about ¼ inch into the transducer outlet 54 and the other end a like amount into the inlet hole 34 of the gage 4. However, before the final connection is made, the gage should be checked to see that it is properly zeroed. This can be done by holding it vertically and looking through the transparent portion 16 to see if the top edge of liquid 26 visible therethrough is at the zero line. If not, the gage should be zeroed by holding it almost horizontal with the top end 12 slightly higher than the other end and with the transparent portion 16 facing up. It is held in this position for about a minute. When the gage is returned to the vertical position, if it is now zeroed, it is connected to the tube 8. If still not zeroed, the correction operation as described should be repeated.

The new speedometers of the invention provide accurate and reliable speed measurement for high performance sailcraft or other watercraft. They can measure speed to 30 mph. In the full range 5 to 30 mph. the scale divisions are very nearly equally spaced making it easy to read across the full range. The mounting as shown and described above has been specifically designed for boats having a dolphin striker. However, as shown in FIG. 7, the mounting system can be modified to mount on the transom 74 of a boat. In this version, the mount unit consists of a clip 76 and no transmitter tube is needed since the gage 4 is attached directly to the transducer 6.

The depthmeters of the invention are much like the speedometers except for the transducer and, of course, the indicia along the transparent portion 16 of the gage 4 indicate depth in feet rather than speed in mph.

A transducer 86 for use with the new depthmeters comprises a chamber 88 defined by a tubular section 90 made of rigid plastic or metal tubing, a top end plug 92 through which a fluid outlet tube 94 extends to which the transmitter tube 8 may be fastened. The bottom end 96 of the tube section 90 is plugged with the lead weight 98 through which the central hole 100 extends to join the chamber 88 to ambient. A releasable check valve 102 or similar means may be included in the upper end of the transmitter tube 8 to hold the the indicator fluid 26 at the maximum value attained during an immersion in the ambient water until the user can make a reading at which time the valve or other means may be operated by the user to allow the fluid 26 to zero or seek a new depth value. This check means arrangement can allow the depthmeter to be used much like a convention "lead line" which is cast forward on a moving boat to sink to the bottom as the boat passes over the spot of contact of the weight with the bottom.

In use, the depthmeter is assembled by connecting the transducer 86 to a gage (not shown), similar to gage 4 graduated in feet, via a transmitter tube 8. The gage can be hand held or supported on some part of a boat above the water. The transducer 86 is them thrown into the water where it will sink rapidly to the bottom. As it sinks, the gas (air) volume in the chamber 88 decreases thereby reducing the buoyancy the lower it sinks. The depth for measurement is limited only by the practical length for the transmitter tube 8. Excess of tubing 8 when measuring depths less than the maximum does not affect the depth reading since, unlike a lead line, the tube 8 does not need to be straight and taut from transducer 86 to the gage to obtain an accurate reading.

As previously indicated, various modifications of the new devices will become apparent to those skilled in the art from the foregoing disclosure. For example, two separate speed ranges may be incorporated in the new speedometers by providing two separate, different sized gage tubes and including an indicia scale for one such tube on one side of the transparent portion 16 and another scale on the other side of portion 16 for the other gage tube. Depending on the speed range to be measured, one or the other of the two Pitot tubes will be inserted in the transducer 6.

In an alternative form of a two speed range speedometer, the transducer may be structured to operate two different gage tubes at the same time with a central flapper valve (not shown) connecting the tube to the inlet 68 of the chamber 52. Change in speed range would be obtained in this modification by switching the flapper valve.

The embodiments of the invention in which an exclusive property or privilege is claimed are defined as follows:

1. A watercraft speedometer which comprises:
   a. a transducer for immersion in the water in which the watercraft floats, said transducer including a tubular chamber having closed top and bottom ends, a fluid outlet for said chamber in said top end, and a Pitot tube connected to said bottom end,
   b. a gage to be carried by said watercraft above said water comprising a tubular section of rigid material having a closed top end and a closed bottom end, a longitudinal transparent portion in said tubular section, a longitudinal rigid strip within said tubular section dividing it into first and second gas compartments, an opening through said rigid strip adjacent said bottom end of said tubular section providing a passageway connecting said first gas compartment to said second gas compartment, a liquid piston moveable through said passageway responsive to changes in gas pressure occurring in said second gas compartment and indicia spaced apart along said transparent portion to indicate the degree of said piston movement, and
   c. a flexible tube connecting said fluid outlet to said second gas compartment to transmit gas pressure variations from said chamber to said second compartment.

2. A watercraft depthmeter which comprises:
   a. a transducer for immersion in the water in which the watercraft floats, said transducer including a tubular chamber having closed top end through which a fluid outlet passes, a bottom end that is weighted and has an opening therein to join the interior of said tubular section to ambient,
   b. a gage to be carried by said watercraft above said water comprising a tubular section of rigid material having a closed top end and a closed bottom end, a longitudinal transparent portion in said tubular section, a longitudinal rigid strip within said tubular section dividing it into first and second gas compartments, an opening through said rigid strip adjacent said bottom end of said tubular section providing a passageway connecting said first gas compartment to said second gas compartment, a liquid piston moveable through said passageway responsive to changes in gas pressure occurring in said second gas compartment and indicia spaced apart along said transparent portion to indicate the degree of said piston movement, and
   c. a flexible tube connecting said fluid outlet to said second gas compartment to transmit gas pressure variations from said chamber to said second compartment.

3. The depthmeter of claim 2 that includes means to maintain a maximum reading on said gage until released by the user of the depthmeter.

4. A meter for measuring the depth of water sur-rounding a watercraft which comprises:
   a. a transducer for immersion in said water, said transducer including a chamber having a tubular section with a top end through which a fluid outlet for said chamber passes and a weighted bottom end with an opening therein to join the interior of said tubular section to ambient,
   b. means to convert pressure applied to said transducer by said water to a gas pressure within said chamber of a magnitude that is a function of the water applied pressure,
   c. a gage to be carried by said watercraft above said water, said gage including a first gas compartment, a second gas compartment, a passageway connecting said first gas compartment to said second gas compartment, a piston moveable through said passgeway responsive to changes in gas pressure occurring in said second gas compartment and means to indicate the degree of said piston movement, and
   d. means connecting said fluid outlet to said second gas compartment to transmit gas pressure variations from said chamber to said second compartment.

5. A device for measuring a condition existing between a watercraft and the water surrounding the watercraft which comprises:
   a. a transducer for immersion in said water, said transducer comprises a tubular section having a top end through which said fluid outlet passes and a bottom end which is weighted and has an opening therein to join the interior of said tubular section to ambient, including a chamber, a fluid outlet for said chamber, and means to convert pressure applied to said transducer by said water to a gas pressure within said chamber of a magnitude that is a function of the water applied pressure,
   b. a gage to be carried by said watercraft above said water, said gage including a first gas compartment, a second gas compartment, a passageway connecting said first gas compartment to said second gas compartment, a piston moveable through said passageway responsive to changes in gas pressure occurring in said second gas compartment and means to indicate the degree of said piston movement,
   c. said gage further comprising a tubular section of rigid material having a closed top end and a closed bottom end, a longitudinal transparent portion in said tubular section, a longitudinal rigid strip within said tubular section dividing it into said first and second compartments and said means to indicate are indicia spaced apart along said transparent portion, and
   d. means connecting said fluid outlet to said second gas compartment to transmit gas pressure variations from said chamber to said second compartment.

6. The device of claim 5 wherein said passageway is an opening through said rigid strip adjacent said bottom end of said tubular section and said piston is a liquid within said tubular section in quantity to fill only a portion of the volume enclosed by said tubular section.

7. The device of claim 5 wherein said first compartment is totally closed except for its connection with said passageway and said second compartment has an inlet therein for connection to said flexible tube.

8. The device of claim 7 wherein a tube having a lumen smaller than the lumen of said second compartment is joined at its bottom end to said inlet, extends substantially centrally part way up the interior of said second compartment and its top end has a restricted opening into said second compartment.

9. The device of claim 5 wherein said transducer comprises a Pitot tube having a lower end in which its pickup hole is located and a open upper end, said chamber is defined by a rigid tube with closed top and bottom ends, an opening in said bottom end to tightly receive said upper end of said Pitot tube, said fluid outlet in said top end and clamp means fixed to the outside of said rigid tube by which the transducer may be attached to a watercraft to extend into the water surrounding said watercraft.

* * * * *